United States Patent [19]
Engle

[11] Patent Number: 5,867,243
[45] Date of Patent: Feb. 2, 1999

[54] ELECTRON BEAM ADDRESSED LIQUID CRYSTAL CELL

[76] Inventor: Craig D. Engle, 336 Cline Ave., Griffith, Ind. 46319

[21] Appl. No.: 699,511

[22] Filed: Aug. 19, 1996

[51] Int. Cl.[6] .......................... G02F 1/1333; G02F 1/133; G02F 1/13
[52] U.S. Cl. .............................. 349/158; 349/84; 349/31; 349/200
[58] Field of Search .............................. 349/31, 158, 160, 349/153, 84, 200

[56] References Cited

U.S. PATENT DOCUMENTS

| | | | |
|---|---|---|---|
| 3,295,028 | 12/1966 | Argue et al. | 317/230 |
| 3,445,707 | 5/1969 | Gilvey et al. | 313/68 |
| 3,627,408 | 12/1971 | Fergason | 353/84 |
| 3,781,087 | 12/1973 | Nagasaki | 350/160 LC |
| 3,862,830 | 1/1975 | Stern | 65/68 |
| 3,866,313 | 2/1975 | Yih | 29/592 |
| 4,116,544 | 9/1978 | Soref | 350/336 |
| 4,387,964 | 6/1983 | Arrazola et al. | 350/331 |
| 4,443,063 | 4/1984 | Nishiyama | 350/334 |
| 4,784,883 | 11/1988 | Chitwood et al. | 428/1 |
| 5,016,987 | 5/1991 | Smith, Jr. | 350/344 |
| 5,036,317 | 7/1991 | Buzak | 340/783 |

OTHER PUBLICATIONS

J. R. Hansen, R. J. Schneeberger, Liquid Crystal Media for Electron Beam Recording, IEEE Transactions on Electron Devices, vol. ED–15, No. 11, Nov. 1968.

U. Wolff et al, "The Homogeneous Alignment of Liquid Crystal Layers" Molecular Crystals and Liquid Crystals, 1973. vol. 23, pp. 187–196.

Albert G. Ingalls, "Amateur Telescope Making" Scientific American, Inc. New York, 1962, pp. 242–244.

*Primary Examiner*—William L. Sikes
*Assistant Examiner*—Tarifur R. Chowdhury

[57] ABSTRACT

A liquid crystal cell (10) is formed with a hollow cylinder (12) and a solid cylinder (32) inserted into a hole (32) of the hollow cylinder (12) so that a first reference surface (34) of the solid cylinder (32) lies between a first reference surface (14) of the hollow cylinder (12) and a second surface (13) of the hollow cylinder (12). The first reference surface (14) of the hollow cylinder (12) and the second surface (13) of the hollow cylinder (12) are essentially parallel surfaces which are perpendicular to the axis of revolution (18) of the hollow cylinder (12). The solid cylinder (34) is affixed to the hollow cylinder (12) to maintain a fixed gap (38) between the first reference surface (14) of the hollow cylinder (12) and the first reference surface (34) of the solid cylinder (32). A third substrate (58) is in contact with the first reference surface (14) of the hollow cylinder (12) to establish a cavity (70) between the third substrate (58) and the first reference surface (34) of the solid cylinder (32) for confining a liquid crystal material in the cell (10).

11 Claims, 5 Drawing Sheets

ELECTRON BEAM ADDRESSED LIQUID CRYSTAL CELL

BACKGROUND

1. Field of Invention

This invention relates to electron beam addressed liquid crystal cells and method of fabricating same.

2. Prior Art

Prior art electron beam addressed liquid crystal cells include configurations which utilize a thin substrate facing the electron beam source. As identified in U.S. Pat. No. 4,387,964 to Arrazola et al, Jun. 14, 1983, the thickness of the thin substrate facing the electron source influences trade offs involving resolution and mechanical stability. Consequently, it is imperative that a liquid crystal cell configuration which utilizes a thin substrate facing the electron beam source possess attributes which facilitates an optimal comprise.

The cell of U.S. Pat. No. 4,387,964 utilizes discrete spacers which are permanent to the cell in order to establish a separation gap in the liquid crystal cell. Several problems exist with the utilization of discrete spacers in liquid crystal cells. If a gasket is utilized on the peripheral of the cell, then tolerances associated the thickness of gaskets can introduce variations in cell to cell performance.

As identified in U.S. Pat. No. 4,784,883 to Chitwood et al, Nov. 15, 1988, alternative spacer techniques include the use of spheres distributed in the cell gap. Under high magnification, utilizing spacing spheres could adversely effect the quality of the optical image associated with the cell.

Alternative techniques to the use of a thin substrate include "charge transfer plates" and/or "wire mosaics". Such devices are well understood by those knowledgeable in the state of the art. Such devices are relatively complicated to fabricate. In addition, registration between the conductive pins and a serial scanning electron beam can pose additional problems.

Utilization of a target which incorporates a periodic structure with a serial scanned electron beam addressing mechanism would adversely effect one of the most desirable attributes associated with serial scanning element at a time electron beam scanning; the capability to conveniently change the format of the raster scan pattern. Applicant believes that use of any periodic structure in the target, for insuring a consistent cell gap and/or to transfer charge in the target, would tend to favor raster scan patterns which have a pixel count related to the spatial period of the periodic structure. Accordingly, a need exists for an electron beam addressed liquid crystal cell which overcomes the limitations of prior art.

OBJECTS AND ADVANTAGES

Accordingly, several objects and advantages of my invention are:

1) To identify a new liquid crystal cell configuration which enables a consistent cell gap dimension to be established in the cell.
2) To identify how to establish a consistent gap within a liquid crystal cell without the need for introducing a discrete spacer technology in the cell.
3) To identify manufacturing techniques which are compatible with my invention.
4) To identify the advantages of eliminating the need for a discrete spacer technology in a liquid crystal cell.
5) To identify how a composite arrangement of substrates can be configured to construct a liquid crystal cell without the need for a discrete spacer technology.
6) To identify how a liquid crystal cell fabricated from a composite arrangement of substrates facilitates liquid crystal cell processing requirements.
7) To identify several liquid crystal materials which can be utilized with my invention.

Further objects and advantages of my invention will become apparent from a consideration of the drawings and ensuing description of it.

LIST OF FIGURES

DESCRIPTION OF INVENTION

Figure 1:
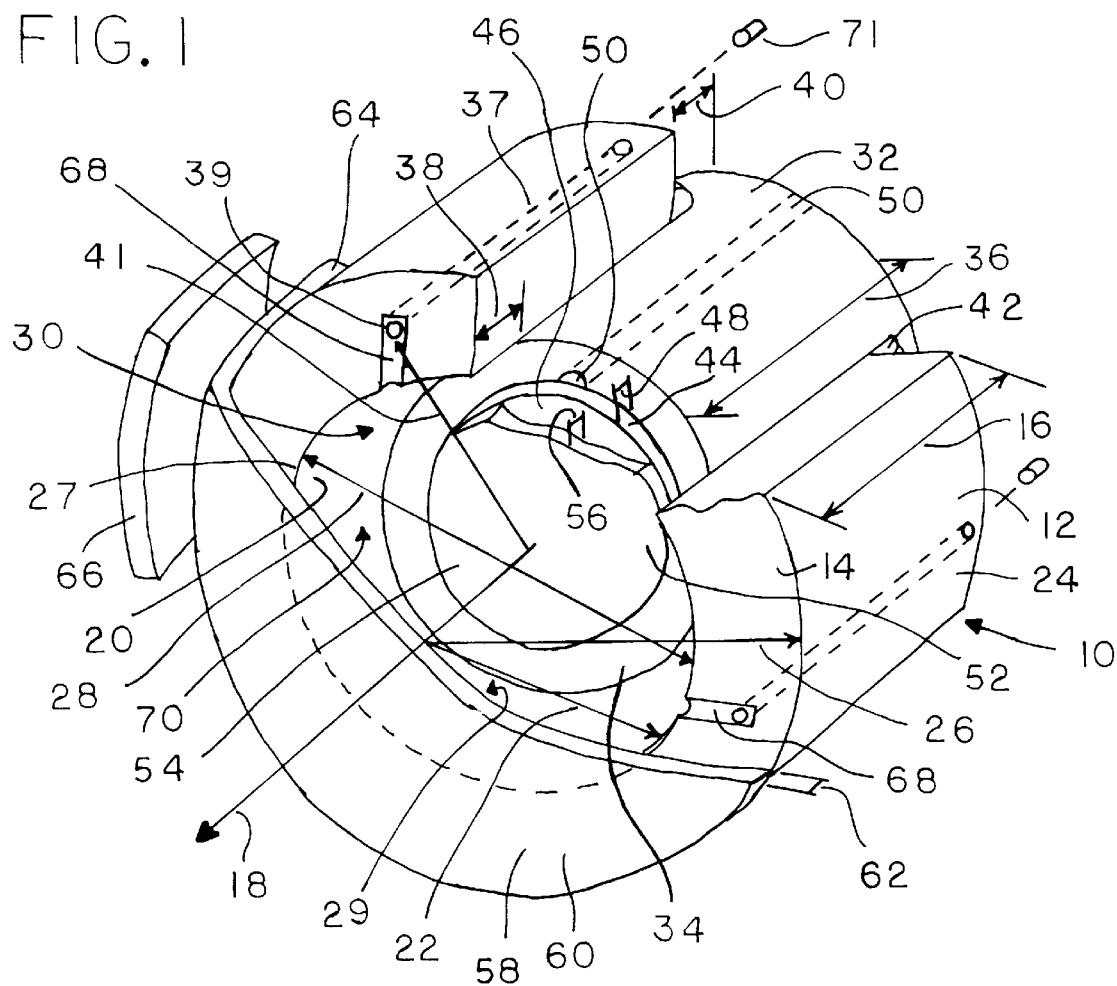
FIG. 1 shows a liquid crystal cell formed from a composite of substrates.

FIG. 1 shows a perspective view of a composite liquid crystal cell 10. Cell 10 contains a hollow cylinder 12. Portions of FIG. 1 have been shown cut away for clarity. Cylinder 12 further includes a first surface 14 essentially parallel to and separated from a second surface by a cylinder thickness 16. Thickness 16 is perpendicular to surface 14. Cylinder 12 further includes an axis of revolution 18. Axis 18 is parallel to thickness 16. Cylinder 12 further includes an inside wall 20 separated from axis 18 by an inside radius 22. Radius 22 is perpendicular to axis 18 and wall 20.

Cylinder 12 further includes an outside wall 24 separated from axis 18 by an outside radius 26. Radius 26 is perpendicular to axis 18 and wall 24. Cylinder 12 further includes an inside wall diameter 28. Diameter 28 is perpendicular to thickness 16. Axis 18 is the perpendicular bisector of diameter 28. Providing cylinder 12 with an inside diameter 28 creates a hole 30 which extends from surface 14 of cylinder 12 to the second surface of cylinder 12. The second surface of cylinder 12 is not visible in the figure. Hole 30 creates an opening 29 in surface 14. Opening 29 further includes a perimeter 27. Perimeter 27 is circular with diameter 28. A similar opening exists on the second surface of cylinder 12 due to hole 30 extending from surface 14 to the second surface of cylinder 12. Opening 29 lies in the plane of surface 14 and with the area of opening 29 bound by perimeter 27.

Materials suitable for use as cylinder 12 includes insulating materials such as glass and/or ceramics. Criteria involved in selecting a material suitable for use as cylinder 12 includes the coefficient of thermal expansion. Metals, such as brass, aluminium, etc may also be utilized for cylinder materials.

Cell 10 further includes a transmissive faceplate 32. Faceplate 32 is a solid cylinder. Faceplate 32 is highly transparent, Faceplate 32 further includes a first surface 34 essentially parallel to and separated from a second surface of faceplate 32 by a faceplate thickness 36. Materials suitable for use as the faceplate includes glass and/or ceramic materials.

Surface 34 is essentially parallel to and offset from surface 14 by a cell gap 38. Gap 38 is parallel to thickness 16. Techniques for establishing parallelism between surface 34 and surface 14 will be identified herein. Furthermore, the technique for establishing parallelism between surface 14 and surface 34 will also establish a means for providing a gap 38 which is consistent from cell to cell.

The second surface of faceplate 32 is displaced from the second surface of cylinder 12 by an offset distance 40. The second surface of faceplate 32 is not visible in the figure. Distance 40 is dependent upon thickness 16 and thickness 36 and gap 38. A glass to glass bonding bead 42 is utilized to rigidly affix faceplate 32 to cylinder 12. Techniques for bonding faceplate 32 to cylinder 12 are well understood by those knowledgeable in the state of the art, and consequently, bead 42 is not shown in detail. Bead 42 establishes a vacuum seal between faceplate 32 and cylinder 12.

Affixed to surface 34 is a transmissive conductive electrode 44. Materials suitable for use as electrode 44 include ITO. Techniques for affixing an electrode to a glass substrate are well understood by those knowledgeable in the state of the art. Electrode 44 further includes a first electrode surface 46 essentially parallel to and separated from a second electrode surface by an electrode thickness 48. The second electrode surface of electrode 44 is in contact with surface 34. The second electrode surface of electrode 44 is not visible in the figure.

A single electrical feedthrough 50 is provided in faceplate 32 to enable an electrical connection external to cell 10 to be established with electrode 44. Techniques to establish an electrical feedthrough in a insulating substrate are well understood by those knowledgeable in the state of the art.

Affixed to surface 46 is an liquid crystal alignment layer 52. Layer 52 further includes a first surface 54 separated from a second surface of layer 52 by a thickness 56. The second surface of layer 52 is not visible in the figure. Materials suitable for use as alignment layers include SiO and magnesium fluoride. Alternatively, alignment layers 52 could be implemented by directional rubbing of surface 46. The second surface of layer 52 is not visible in the figure. See for instance information in the article titled "The Homogeneous Alignment of Liquid Crystal Layers" by U. Wolff et al., Molecular Crystals and Liquid Crystals, 1973, Vol, 23, pp 187–196.

In constant with surface 14 is a thin insulating substrate 58. Substrate 58 further includes a first surface 60 essentially parallel to and separated from a second substrate surface of substrate 58 by a substrate thickness 62. The second surface of substrate 58 is in contact with surface 14. The second surface of substrate 58 is not visible in the figure. Thickness 62 is essentially perpendicular to surface 60 and parallel to thickness 16.

Surface 14 is processed to be essentially planar and very smooth. Due to surface 14 being essentially planar and smooth, the second surface of substrate 58 is in contact with a mechanical boundary condition which promotes the second surface of substrate 58 to assume a planar form which is essentially parallel to surface 14. Utilizing glass and/or ceramic materials for cylinder 12 facilitates achieving a high degree of parallelism between the second surface of substrate 58 and surface 34 of faceplate 32. This is attributed to the fact that polishing techniques utilized to finish the surface of glass materials enables glass surfaces to achieve a high degree of perfection, i.e. very planar and/or flat and very smooth. Techniques for processing surfaces of glass materials to achieve these finishes are well understood by those knowledgeable in the state of the art.

As to be shown herein, the quality of surface 14 is fundamental to establishing a desired gap 38 between the essentially flat and/or planar surface 14 and the essentially parallel surface 34.

Materials suitable for use as substrate 58 includes glass. Additional materials suitable for use as substrate 58 include mica. Additional materials utilizable for use as substrate 58 include Mylar. Mylar is a trademark of the Dupont corporation of Wilmington, Del. Criteria for selecting a suitable material include the maximum value of the second electron emission ratio and the value of the primary energy at which the maximum value exists. As to be shown herein, surface 60 may be electron beam addressed in conjunction with the voltage applied to electrode 44 to establish electric fields in cell 10. Consequently, the secondary electron emission ratio influences the nature of the electron beam addressing means utilized to apply a potential difference to the cell. Electron beam writing and erasing techniques and the value of the secondary electron emission ratio desired for consistency with the writing and/or erasing technique are well understood by those knowledgeable in the state of the art.

Substrate 58 is affixed to cylinder 12. Due to the latitude available with the material selection for substrate 58, several techniques can be utilized to establish contact between the second surface of substrate 58 and surface 14 of cylinder 12 when substrate 58 is affixed to cylinder 12. FIG. 1 shows a folded portion 64 of substrate 58 formed around wall 24 of cylinder 12. The substrate 58 is stretched in forming portion 64 so as to create a tension in the substrate 58 which facilitates maintaining the second surface of substrate 58 parallel to and in contact with surface 14. A locking ring 66 is utilized to secure portion 64 of substrate 58 to wall 24 of cylinder 12 thereby preserving a tension state in substrate 58 which facilitates achieving parallelism of the second surface of substrate 58 with surface 14. Ring 66 is shown cutaway and separated from cylinder 12 for clarity. Use of such techniques to assist in mounting a flexible substrate to a reference surface are well understood by those knowledgeable in the state of the art. See for instance information concerning the sandwhich hoop assembly in the reference titled "Liquid Crystal Media for Electron Beam Recording" by J. R. Hansen et al, IEEE Transactions On Electron Devices, Vol ED-15, Nov. 68. As to be shown herein, alternative techniques exist for securing substrate 58 to cylinder 12.

Securing substrate 58 to cylinder 12 creates a cavity 70 for retaining electro optic material introduced into cavity 70. Cavity 70 is the volume of space existing between the second surface of substrate 58 and surface 34 and bound by hole 38. The volume of cavity 70 is influenced by gap 38 and diameter 28.

A plurality of channels 68 are recessed from surface 14 to provide a means to fill cavity 70 formed in cell 10 with a electro optic material. Channels 68 extend from wall 20 to a radial location 41 offset from axis 18 where the channel 68 intersects a port hole 39 of a vertical fill channel 37 formed in cylinder 12. The vertical fill channel 37 is a small diameter hole existing in cylinder 12 to assist filling cavity 70 with access provided from the second surface of cylinder 12. This procedure avoids additional processing of portion 64 to facilitate access to channels 68.

Cavity 70 is a small cylindrical volume established by gap 38 and the area bound by diameter 28. Electrooptic materials which can be utilized with cell 10 include liquid crystals materials and kerr effect liquids. Suitable liquid crystal materials include cholesteric phase and/or nematic phase liquid crystals. Techniques for filling cavity 70 with a liquid crystal material by utilizing channels 68 and channels 37 could include the process identified in U.S. Pat. No. 3,866,313 to Yih, Feb. 18, 1975.

Dimensions for gap 38 and channels 68 are selected to enable channels 68 to access cavity 70. Techniques for plugging channels 68 and/or channels 37 after filling cavity 70 are well understood by those knowledgeable in the state of the art. A stopper 71 is inserted in a respective channel 37 to assist in sealing cell 10 after cavity 70 has been filled with a liquid crystal material. The liquid crystal material is not shown in the figure for convenience. Alternatively, a vacuum valve such as an Alpert type Valve could be utilized with channels 37 to assist in filling cavity 70 after a vacuum bake out of cell 10 when cell 10 is sealed to an electron beam addressing mechanism. Such flexibility facilitates lifetime of the electron beam addressing mechanism interfaced to cell 10.

Use of ring 66 enables substrate 58 to be affixed to cylinder 12 with the second surface of substrate 58 overlapping opening 29. Use of ring 66 also enables a sufficient tension to be applied to substrate 58 when affixing substrate 58 to cylinder 12 to establish and/or form a seal with surface 14 at perimeter 27 to assist in sealing electro optic material in cavity 70. Accordingly, use of ring 66 and/or stoppers 71 is a sealing means to seal and/or retain a liquid crystal material in cavity 70. The tension applied to substrate 58 may be varied to facilitate establishing this seal. As to be shown herein, additional techniques are available with my invention to assist in sealing cavity 70.

Figure 2:
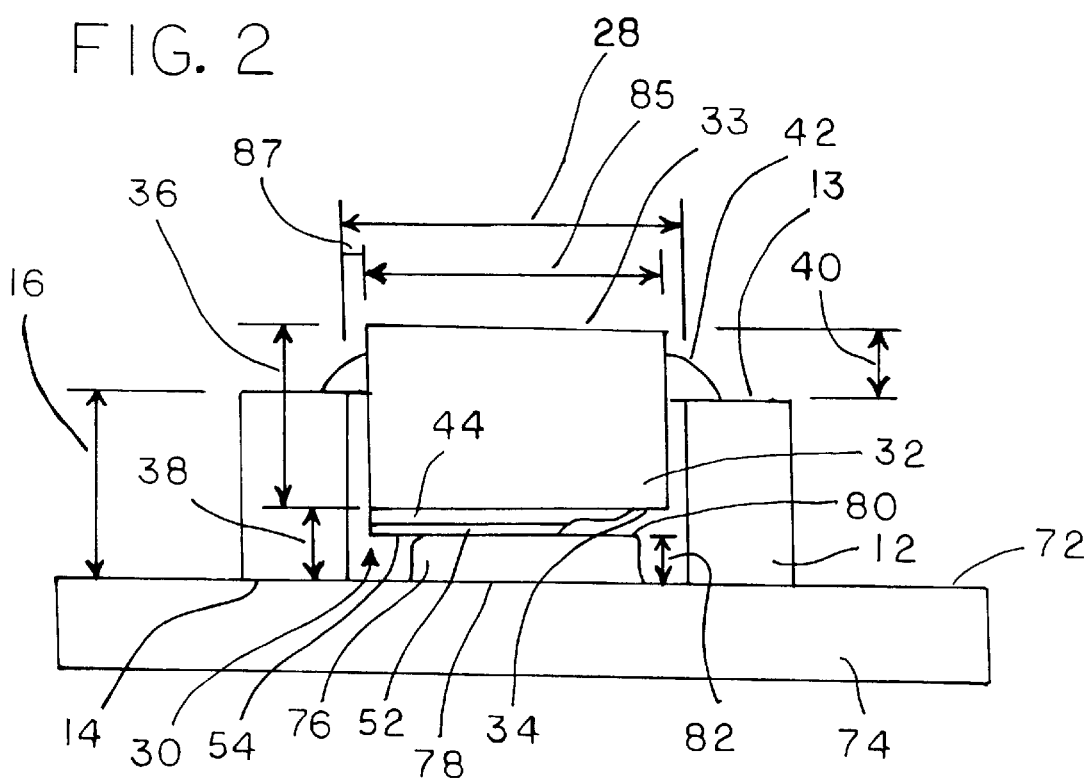
FIG. 2 shows a processing step associated with the fabrication of my invention which eliminates the need for a discrete spacer technology to be incorporated within the cell.

FIG. 2 shows a cross sectional view of a fabrication technique which can be utilized to affix faceplate 32 to cylinder 12 so as to establish a desired value for gap 38. FIG. 2 shows a work bench 74. Bench 74 further includes a flat, highly smooth work surface 72. Surface 14 of cylinder 12 is in contact with surface 72. Affixed to surface 72 is a reference gauge plug 76. Plug 76 further includes a first surface 78 in contact with surface 72 and a second surface 80 essentially parallel to and separated from surface 78 by a plug thickness 82. Thickness 82 is perpendicular to surface 72.

Techniques for affixing plug 76 to surface 72 of bench 74 could include vacuum techniques. Several small holes could be drilled in bench 74 to assist in establishing a vacuum force to firmly hold plug 76 to surface 72. Such small holes and the necessary pumping equipment are not shown in the figure for convenience. Surface 80 and surface 78 are highly parallel surfaces. Plug 76 can be formed by a variety of techniques which includes affixing a cleaved piece of Mica to surface 72. Alternative techniques include depositing thin film layers on surface 72 to the desired thickness. Utilizing the information provided herein, such techniques will be obvious to those knowledgeable in the state of the art. Alternatively, a thin metal foil may be utilized for a plug.

Cylinder 12 is positioned relative to plug 76 so plug 76 is contained within hole 30 of cylinder 12. Surface 14 is in contact with surface 72. Faceplate 32 is inserted in hole 30 with surface 34 facing plug 76. Prior to inserting faceplate 32 into hole 30, transparent electrode 44 and alignment layer 52 are affixed to surface 34. Fabricating a liquid crystal cell from a composite of substrates enables concurrent processing steps to be applied to each component forming the cell. This latitude facilitates high volume manufacturing.

Faceplate 32 is shown in a simplified manner. Faceplate 32 further includes a diameter 85. Diameter 85 is perpendicular to thickness 36. Diameter 85 is chosen to be slightly less than diameter 28 of cylinder 12 to establish a radial separation 87 between faceplate 32 and cylinder 12. Faceplate 32 is positioned toward surface 80 of plug 76 along cylinder 12 until layer 52 contacts plug 76 thereby inhibiting further motion of faceplate 32. After faceplate 32 establishes a stationary position attributed to plug 76, faceplate 32 is then bonded to cylinder 12 with bead 42. Use of plug 76 to prevent motion of faceplate 32 at a distance related to height 82 enables gap 38 to be established between surface 14 and surface 34 since surface 14 and surface 82 are referenced to surface 78. Gap 38 is related to thickness 82.

Use of my invention enables a convenient means to affix faceplate 32 to cylinder 12 so that gap 38 associated with each liquid crystal cell is traceable to a single spacer attributed to plug 76. Such techniques are essential for establishing a consistent, cost effective manufacturing technique for liquid crystal cells.

By eliminating the need for a discrete spacer technology in the cell, my invention enhances cell reproducibility and/or image quality attributed to the cell. Furthermore, my invention eliminates extraneous components associated with the prior art.

After affixing faceplate 32 to cylinder 12, cylinder 12 is removed from work bench 74. The second substrate can then be affixed to cylinder 12 to complete fabrication of the liquid crystal cell. These additional processing steps are not shown in FIG. 2.

A second faceplate surface 33 of faceplate 32 is offset from a second cylinder surface 12 of cylinder 12 by offset distance 40. As previously identified, distance 40 is influenced by the value of thickness 16 which separates surface 14 of cylinder 12 and surface 13 of cylinder 12 and by the value of thickness 36 which separates surface 34 of faceplate 32 and surface 33 of faceplate 32 in addition to the value of gap 38.

Figure 3:
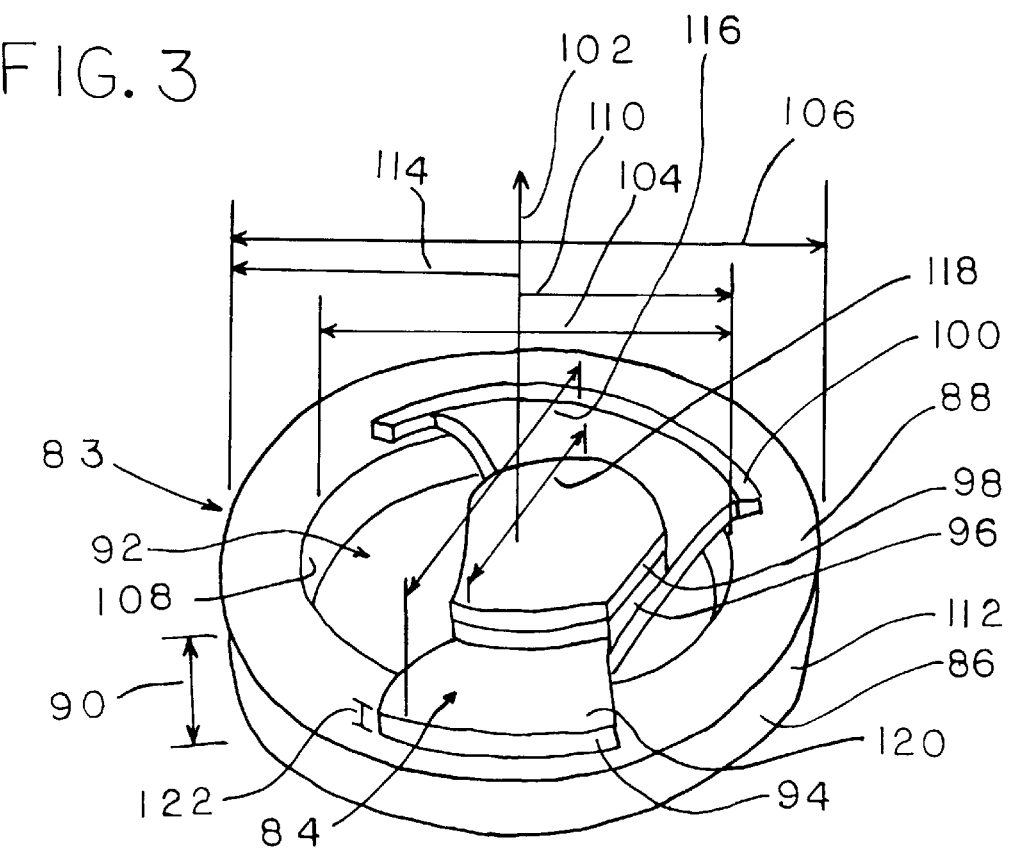
FIG. 3 shows an assembly which facilitates interfacing a liquid crystal cell to an electron beam source.

FIG. 3 shows a backplate assembly 83. Assembly 83 contains a multilayer substrate 84 affixed to a vidicon tube interface ring 86. As to be shown herein, ring 86 can utilized to facilitate affixing a liquid crystal cell to an electron beam addressing device. Ring 86 further includes a second surface 88 essentially parallel to and separated from a first surface of ring 86 by a ring thickness 90. Surface 88 is essentially planar, flat and smooth. The first surface of ring 88 is not visible in the figure.

Ring 86 further includes a hole 92 which extends from surface 88 to the first surface of ring 86. The first surface of ring 86 is not visible in the figure. Materials suitable for use as ring 86 includes glass and/or ceramics. Material suitable for use as ring 86 includes an alloy of about 51% iron and 49% nickel.

Substrate 84 comprises an insulating layer 94 affixed to surface 88. Substrate 84 further includes a multilayer dielectric reflector 96 affixed to layer 94. Reflector 96 is shown as a single layer in the figure for convenience. Affixed to reflector 96 is a liquid crystal alignment layer 98. A seal bead 100 is utilized to affix layer 94 to ring 86. Reflectors and alignment layers for use with liquid crystal cells are well understood by those knowledgeable in the state of the art, and consequently, reflector 96 and layer 98 are not shown in detail.

Techniques for affixing an insulating layer to a ring are well understood by those knowledgeable in the state of the art. See for instance information in U.S. Pat. No. 3,445,707 to Gilvey et al, May 20, 1969. Layer 94 is affixed to ring 86 by the utilization of bead 100. Such configurations are well understood by those knowledgeable in the state of the art. Considerations in identifying methods of affixing layer 94 to ring 86 should include which technique facilitates achieving a planar profile for layer 94. The coefficient of thermal expansion of ring 86 could be selected to be less than the coefficient of thermal expansion of layer 94 to assist in applying a tension to layer 94.

Ring 86 further includes an axis of symmetry 102. Hole 92 includes an inside diameter 104. Diameter 104 is perpendicular to axis 102. Axis 102 is the perpendicular bisector of diameter 104. Ring 6 further includes an outside diameter 106. Diameter 106 is perpendicular to axis 102. Axis 102 is the perpendicular bisector of diameter 106. Ring 86 further includes an inside wall 108. Wall 108 is perpendicular to diameter 104. Wall 108 is separated from axis 102 by an inside radius 110. Ring 86 further includes an outside wall 112. Wall 112 is separated from axis 102 by an outside radius 114. Radius 114 is perpendicular to wall 112.

Layer 94 possesses a diameter 116. Diameter 116 is greater than diameter 104 so that layer 94 extends over hole 92 and overlaps surface 88 to facilitate affixing layer 94 to ring 86. Axis 102 is the perpendicular bisector of diameter 116. Reflector 96 and alignment layer 98 possess a diameter 118. Layer 94 further includes a second surface 120 essentially parallel to and separated from a first surface of layer 94 by a layer thickness 122. The first surface of layer 94 is not visible in the figure. The first surface of layer 94 is in contact with surface 88. Reflector 96 is affixed to surface 120. A key advantage of my invention is the fact that the liquid crystal cell is fabricated from a composite of substrates. This facilitates concurrent processing of the component substrates. This processing technique is a feature available with my invention.

Figure 4:
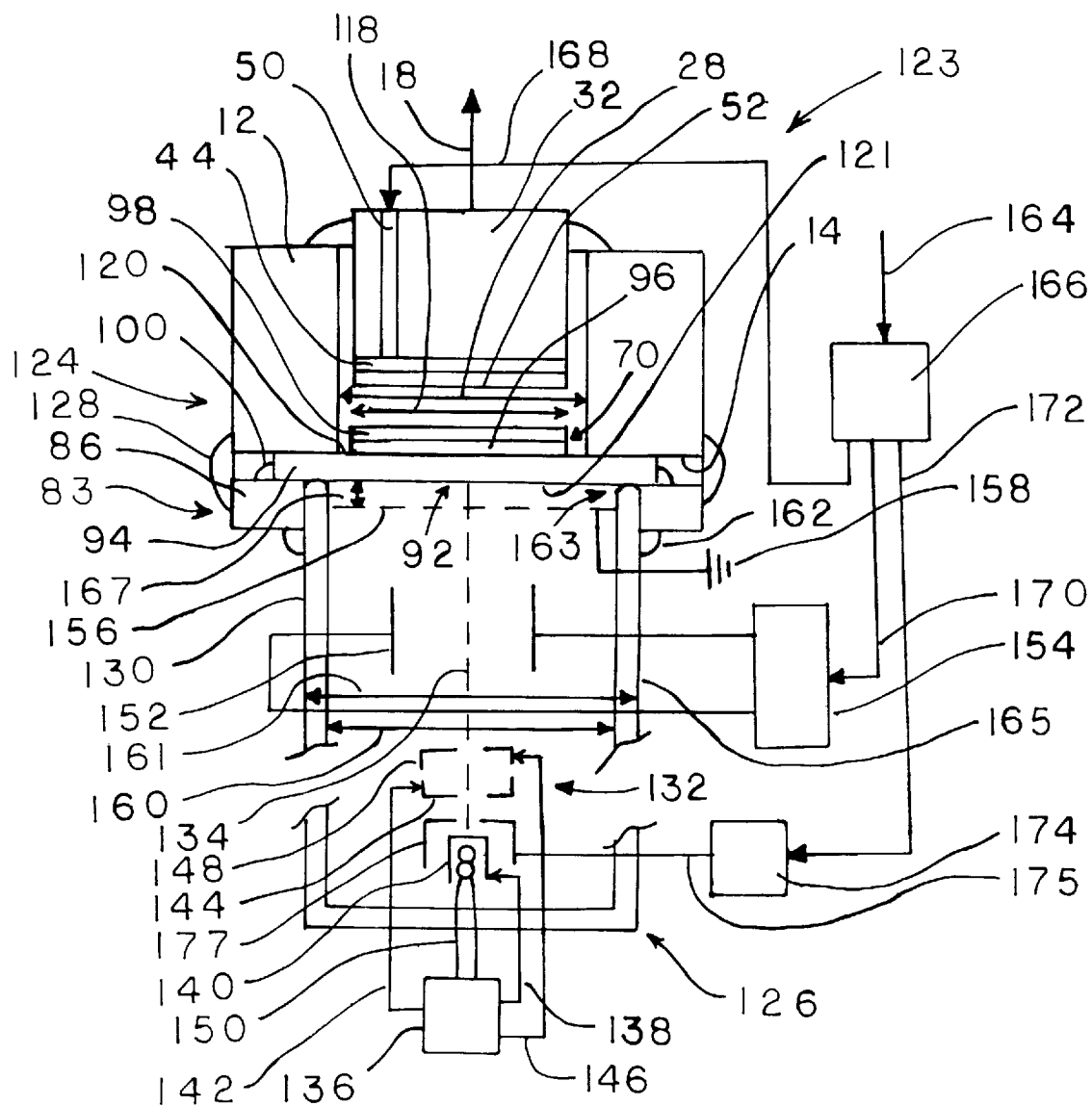
FIG. 4 shows an electron beam source interfaced to a liquid crystal cell.

FIG. 4 shows a liquid crystal modulator 123. Modulator 123 further includes a liquid crystal cell 124 interfaced to an electron beam addressing mechanism 126. Cell 124 comprises faceplate 32 affixed to cylinder 12. Cell 124 further includes assembly 83 affixed to cylinder 12 with an seal bead 128 to assist in interfacing cell 124 to a vacuum tube 130 of mechanism 126. Cell 124 is given a different designation than prior cells to emphasize that cell 124 is configured to facilitate an interface to an electron beam addressing mechanism. Certain portions of the figure have been shown cutaway for clarity.

Affixing assembly 83 to cylinder 12 enables the essentially flat layer 94 to form a seal with surface 14 to retain liquid crystal material in cavity 70 of cell 124. The liquid crystal material is not shown in the figure for convenience. Surface 14 of cylinder 12 is in contact with surface 120 of layer 94.

FIG. 4 shows layer 94 affixed to ring 86 with bead 100. This facilitates consistency with FIG. 3. However, Applicant wants to emphasize that layer 94 may be affixed to ring 86 by use of a modified bead. Utilizing a modified bead enables layer 94 to be affixed to surface 14 and ring 86 while also affixing ring 86 to cylinder 12 with a single bonding operation. Utilizing the information provided herein, the modifications required to achieve this configuration will be obvious to those knowledgeable in the state of the art.

Diameter 118 is selected to be less than diameter 28 so that layer 98 and reflector 96 protrude into cavity 70 of cell 124. Relative orientation required between layer 98 and layer 52 to be enable the liquid crystal material introduced into cavity 70 to perform in a predictable manner for a variety of liquid crystal materials and/or phenomena are well understood by those knowledgeable in the state of the art. Consequently the details associated with layers 98 and 52 are not shown in details. Cell 124 is compatible with twisted nematic liquid crystal materials. The liquid crystal material is not shown in the figure for convenience.

Mechanism 126 further includes an electron gun assembly 132 for generating an electron beam 134. Electrons gun assemblies are well understood by those knowledgeable in the state of the art and consequently assembly 132 is not shown in detail. Mechanism 126 further includes a power supply 136 for applying a first voltage 138 to a cathode 140 of assembly 132 and a second voltage 142 to an acceleration grid 144 of assembly 132 and a third voltage 146 to a focusing mechanism 148. Supply 136 is electrically connected to a heater filament 150 to assist cathode 140 in generating beam 134.

Mechanism 126 further includes an electron beam deflection means 152 electrically connected to a deflection amplifier 154. Electron beam 134 is shown in an non deflected state and when in the non deflected state, beam 134 is colinear with the axis of revolution of tube 130.

Mechanism 126 further includes an electron collector mesh 156 electrically connected to ground potential 158. The voltages applied to mechanism 126 by supply 136 are selected relative to ground potential 158 and the peak in the curve of the secondary electron emission ratio versus primary electron energy for the material utilized for layer 94 to implement a high velocity mode of equilibrium writing with mechanism 126. Such considerations are well understood by those knowledgeable in the state of the art and consequently mechanism 126 is not shown in detail. Electrons in beam 134 are accelerated due to the potential difference existing between cathode 140 and mesh 156 to enable electrons to strike layer 94 with sufficient energy to create a secondary electron emission ratio which exceeds unity. As to be described herein, this enables the potential difference applied between electrode 44 and mesh 156 to influence the amount of electronic charge which is deposited on layer 94.

Tube 130 further includes an inside diameter 160. In the non deflected state, beam 134 coincides with the perpendicular bisector of diameter 160. Cylinder 12 and ring 86 are positioned relative to tube 130 so that axis 18 and axis 102 coincide with the perpendicular bisector of diameter 160. Axis 102 is not shown in this figure for convenience. In addition, diameter 160 is chosen to be greater than diameter 28 so that tube 130 establishes contact with a portion of layer 94 which is overlapped by surface 14. This enables surface 14 to provide reinforcement against the pressure attributed to tube 130 contacting layer 94. This facilitates sealing cavity 70 with layer 94. FIG. 4 is shown in a cross sectional view and channels and/or stoppers are not shown for convenience.

Tube 130 is affixed to ring 86 by the use of a seal bead 162. Seal bead 162 and bead 128 are selected to enable a vacuum environment to be established with mechanism 126. During the operation of applying bead 162 to seal cell 124 to mechanism 126, the amount of pressure tube 130 exerts on layer 94 may be varied to assist in sealing cavity 70.

The inside diameter of hole 92 in ring 86 is selected to be larger than diameter 160 and slightly larger than an outside diameter 161 of tube 130. Tube 130 is a hollow cylinder with an axis of revolution which corresponds with beam 134 when beam 134 is in a non deflected state. The axis of revolution of tube 130 is the perpendicular bisector of diameter 161.

Selecting the inside diameter of hole 92 in ring 86 to be slightly larger than diameter 161 enables an open end 163 of tube 130 to be inserted into hole 92 of ring 86. Tube 130 is inserted in hole 92 until end 163 contacts a first surface 121 of layer 94. As previously identified, the position of tube 130 is adjusted relative to cell 124 to adjust the pressure end 163 applies on layer 94 to assist in sealing cavity 70 by pressing layer 94 on face 14. After the desired level of pressure is established, ring 86 is affixed to an outside surface 165 of tube 130 with bead 162 to secure the relative positioning of tube 130 with cell 124. Mesh 156 is offset from end 163 by an offset distance 167. End 163 is opposite assembly 132.

An information bearing signal 164 is applied to a video amplifier 166. Amplifier 166 applies a potential signal 168 to feedthrough 50 to develop a potential difference between mesh 156 and electrode 44. Amplifier 166 applies a first synchronization signal 170 to deflection amplifier 154 to synchronize the potential difference applied between electrode 44 and mesh 156 with the position of electron beam 134 on layer 94. Amplifier 166 applies a second synchronization signal 172 to a control grid amplifier 174. Amplifier 174 applies beam current control signal 175 to a control grid 177 of assembly 132 to control the beam current of beam 134 to enable the potential difference applied between electrode 44 and mesh 156 to influence a spatial distribution of charge deposited on layer 94 in accordance with signal 164.

Charge deposited on layer 94 by electron beam 134 establishes a localized electric field in the liquid crystal material confined in cavity 70 enabling the properties of the liquid crystal material to be varied in accordance with signal 164. Electric fields and/or charge deposited on layer 94 are not shown in the figure.

Varying signal 164 will vary a property of the liquid crystal material which will vary a property of an electromagnetic wavefront which is incident on faceplate 32 of modulator 123, traverses cavity 70 to cell 124 and is incident on and reflected by reflector 96, to traverse cavity 70 of cell 134 a second time and issue from modulator 123. This enables a property of the wavefront to be varied in accordance with signal 164. Relationships involving liquid crystal properties and the influence that these properties have on an electromagnetic wavefront for a variety of liquid crystal materials and wavefront properties are well understood by those knowledgeable in the state of the art. The wavefront is not shown in the figure for convenience.

Figure 5:
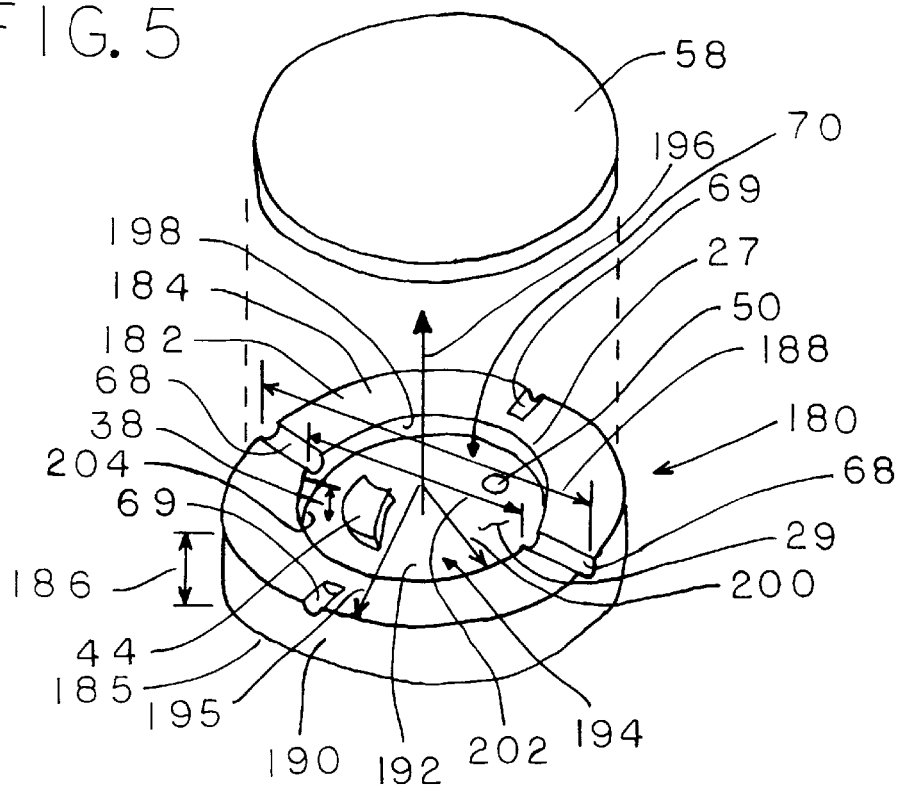
FIG. 5 shows a composite liquid crystal cell fabricated from two substrates.

FIG. 5 shows still yet another liquid crystal cell 180. Cell 180 further includes a first substrate 182. Substrate 182 is highly transparent. Materials suitable for substrate 180 include glass. Substrate 182 further includes a first surface 184 essentially parallel to and separated from a second substrate surface 185 by a substrate thickness 186. Thickness 186 is perpendicular to surface 184. Substrate 182 further includes a first lateral dimension 188. Dimension 188 is perpendicular to thickness 186. As to be more fully described herein, substrate 182 is initially in the form of a solid cylinder with an axis of revolution 196. Axis 196 is parallel to thickness 186. Substrate 182 further includes an outside side wall 190. Wall 190 is separated from axis 196 by a outside radius 195. Radius 195 is perpendicular to axis 196 and wall 190. Axis 196 is the perpendicular bisector of dimension 188.

Surface 184 is processed to be extremely flat and smooth. The necessary lapping and polishing operations to achieve a high degree of flatness and smoothness with surface 184 are well understood by those knowledgeable in the state of the art. Recessed in substrate 182 and offset from surface 184 by gap 38 is a reference surface 192. Surface 192 is processed to be extremely flat and smooth. Surface 192 is essentially parallel to surface 184. Gap 38 is parallel to thickness 186 and perpendicular to surface 192.

Processing substrate 182 so that surface 192 is offset from surface 184 creates a well 194. Well 194 is formed in substrate 182 by creating an opening 29 in surface 184 and removing material from substrate 182 until the desired gap 38 is established. Well 194 is located in substrate 182 so axis 196 is the axis of symmetry of well 194. Opening 29 further includes perimeter 27. Axis 196 is perpendicular to surface 192. Well 194 further includes an inside side wall 198. Wall 198 is separated from axis 196 by a well radius 200. Radius 200 is perpendicular to thickness 186 and perpendicular to axis 196 and perpendicular to wall 198. Well 194 further includes an inside diameter 202. Surface 192 further includes a perimeter 204. The length of perimeter 204 is related to the radius 200 of hole 192. The length of perimeter 204 is approximately equal to the product 2×3.14159×R where R is radius 200. The perimeter distance and gap 38 influences the surface area of wall 198.

An electrical feedthrough 50 is fabricated in substrate 182 from surface 192 to the second surface of substrate 182. Feedthrough 50 enables an electrical connection external to substrate 182 to be established with transparent electrode 44 affixed to surface 192. Only a portion of electrode 44 is shown in the figure for convenience.

Fabricating well 194 in substrate 182 enables substrate 182 and insulating substrate 58 affixed to surface 184 to form cell 180. Substrate 58 is shown offset from substrate 182 for clarity. Any of the techniques identified herein can be utilized to affix substrate 58 to substrate 182. Substrate 58 is affixed to substrate 182 so the portion of substrate 58 which overlaps well 194 is maintained parallel to surface 184. This enables surface 192 and substrate 58 to assist in confining a liquid crystal material to the volume associated with well 194. Channels 68 are shown recessed in surface 182 to enable well 194 of cell 180 to be filled with a liquid crystal material. Channels extend from well 194 to wall 190 in cell 180. Suitable liquid crystal material for use with cell 180 include cholesteric phase liquid crystal materials.

A pair of bonding channels 69 are recessed in substrate 182 from surface 184. A glue or other bonding agent can be introduced into channels 69 to assist in affixing substrate 58 to surface 184 and to assist in confining the liquid crystal material introduced in cell 180 to well 194. Bonding channels 69 do not extend into the volume of well 194. This restriction avoids contamination of liquid crystal material. Only a few bonding channels are shown in the figure for convenience.

Use of a transmissive solid substrate which is processed to establish a first reference surface and a second reference surface embedded in the substrate and offset from the first reference surface by a cell gap enables a highly stable, simple liquid crystal cell construction to be realized. Additional processing required to implement a liquid crystal cell, such as fabricating alignment layers, utilizing stoppers to seal liquid crystal materials in the cell, use of a ring for affixing substrate 58 to substrate 180 etc, have been previously established and are not shown in the figure for convenience.

Applicant believes that substrate 182 can be processed to recess surface 192 in substrate 182 to form well 194 in a relatively straightforward procedure. Initially, surface 184 is polished to a high degree of flatness, i.e. no deviations from an ideal plane should exceed approximately one eight of a wavelength of light with which the cell is to modulate. Applicant believes that surface 192 can be recessed in substrate 184 after establishing flatness requirements on surface 184 by restricting the area of surface 184 which receives additional processing, i.e. additional polishing operations.

By confining additional polishing of surface 184 to the area of surface 184 which overlaps the desired location of well 194, additional material will be removed from the substrate 182 to create well 194. Applicant believes additional polishing would remove material in a manner which avoids damage to the substrate 182. After a suitable amount of material has been removed to recess surface 192 from surface 184 by gap 38, the additional polishing of substrate 182 utilized to create well 194 is terminated. Gap 38 can typically range from the dimensions of approximately 2.5 microns to approximately 10 to 15 microns. By restricting the location where additional polishing operations are performed on substrate 182, additional material can be selectively removed to create well 194. In this manner, a highly stable liquid crystal cell can be fabricated with out the need for a discrete spacer technology in the cell.

Applicant believes that the diameter of polishing tools and/or the motion associated with the polishing tools may be adjusted in a manner to facilitate fabricating well 194. Applicant believes that a polishing tool with a diameter approximately equal to the well diameter, which is less than the diameter of the substrate will enable the well to be realized by additional polishing operations. Such techniques are analogous to zonal polishing techniques utilized to fabricated optical flats. See for instance information in the book titled "Amateur Telescope Making" book one, edited by Albert G. Ingalls, Scientific American, Inc, New York, 1962, pages 242 thru 244, especially FIG. 5 showing the "Rose Tool". Applicant further believes that tapers associated with the inside side wall of the well, which may result from the operations associated with the polishing techniques utilized to create the well, are acceptable. Diamond turning operations may also be utilized to assist in fabricating well 194.

Additional techniques could be utilized to fabricate the well of my invention. Such technique include chemical etching and/or dry etching of the cylinder. Etching provides for a convenient technique for removing material. Upon etching to a suitable depth, the recessed reference surface could be polished to provide the necessary flatness and/or smoothness. Polishing techniques could include chemical polishing techniques. Utilizing the information provided herein, such techniques and the necessary masking operations to restrict material removal to the well location will be obvious to those knowledgeable in the state of the art.

Figure 6:
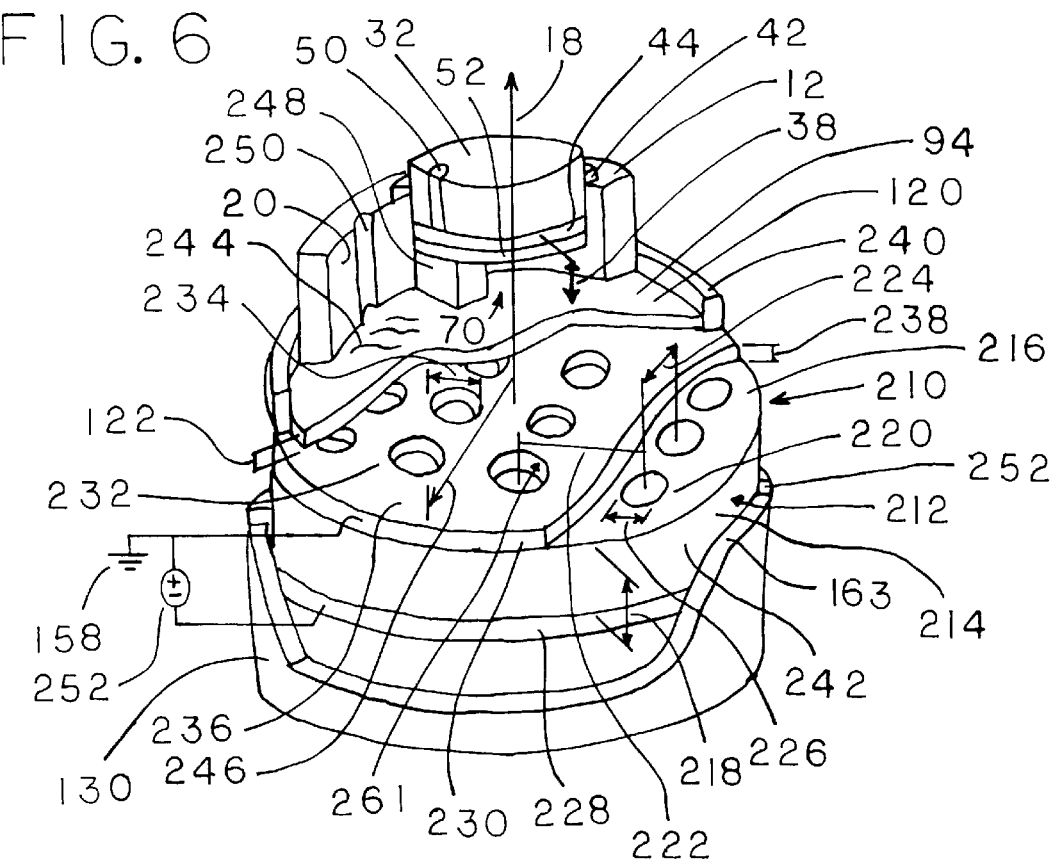
FIG. 6 shows a microchannel plate utilized as a backplate assembly in a liquid crystal cell.

FIG. 6 shows a liquid crystal cell 210. Cell 210 further includes faceplate 32 affixed to cylinder 12 by bead 42. Portions of the figure have been shown cut away for clarity. Cell 210 further includes a microchannel plate (MCP) 212. MCP 212 further includes a porous semiconductor substrate 214. Substrate 214 further includes a second surface 216 separated from a first surface by a thickness 218. The first surface of MCP 212 is not visible in the figure.

MCP 212 further includes an outside wall 242. Wall 242 is separated from cylinder axis 18 by an outside radius 246. Radius 246 is perpendicular to axis 18 and wall 242.

MCP 212 further includes a plurality of pores 220 extending from the first surface of MCP 212 to surface 216. Pores 220 are arranged into a matrix of p rows and q columns. Adjacent pores 220 in each row p are displaced by a first period 222. Adjacent pores 220 in each column q are displaced by a second period 224. Period 222 is perpendicular to period 224 and thickness 218. Period 224 is perpendicular to thickness 218. Each pores 220 further includes an inside diameter 226. Diameter 226 is perpendicular to thickness 218.

Affixed to the first surface of MCP 212 is an input monolithic electrode 228. Affixed to surface 216 is an output monolithic electrode 230. Electrode 230 further includes a first electrode surface essentially parallel to and separated from a second electrode surface 236 by an electrode thickness 238. Thickness 238 is essentially perpendicular to surface 236 and parallel to thickness 218. The first electrode surface of electrode 230 is not visible in the figure. The first electrode surface is in contact with surface 216.

Electrode 230 and electrode 228 further includes a plurality of holes 232. Electrode 228 and electrode 230 are positioned relative to MCP 212 so that each hole 232 in electrode 228 and each hole 232 in electrode 230 overlap a respective pore 220. Each hole 232 further includes an inside diameter 234. Diameter 234 is equal to diameter 226. Holes 232 are centered about a respective pore 220.

Electrode 230 is electrically connected to ground potential 158. An acceleration potential source 252 is electrically connected between electrode 230 and electrode 228 to create an electric field in MCP 212. The electric field in MCP 212 enables MCP 212 to create an amplified electron image at holes 232 of electrode 230 of the electron density which is incident on the holes 232 in electrode 228 which overlaps the respective pore 220. Substrate 214 is processed so pores 220 possess a semiconductor characteristic to enable pores 220 to function as electron multiplers. Such considerations are well understood by those knowledgeable in the state of the art, and accordingly pores 220 are not shown in detail.

Positioning holes 232 relative to a respective pore 220 so that holes 232 are centered relative to the respective pore 220 enables electrons to enter MCP 212 through holes 232 in electrode 228. As well understood by those knowledgeable in the state of the art, pores 220 in MCP 212 are processed to provide for an electron multiplication of the number of electrons which enter a pore 220 and strike the inside surface of the pores 220 while traversing MCP 212 from the first surface to surface 216 due to the electric field which is established in MCP 212 by source 252. This electron multiplication effect increases the number of electrons which leave MCP 212 through the hole 232 in electrode 238 relative to the number of electrons which enter the pore 220 through hole 232 in electrode 228. The holes 232 in electrode 228 are not visible in the figure. Electrons which enter and leave MCP 212 are not shown in the figure.

Insulating layer 94 is affixed to MCP 212. Surface 120 is separated from the first surface of layer 94 by thickness 122. The first surface of layer 94 is in contact with surface 236. The first surface of layer 94 is not visible in the figure. Layer 94 is affixed to MCP 212 by the use of a glass to glass solder ring 240. Portions of the figure are shown cutaway for clarity. Due to surface 236 being essentially flat and/or smooth, the first surface of layer 94 assumes an essentially flat, planar and/or smooth condition. This facilitates surface 120 achieving a flat and/or planar condition.

Ring 240 also affixes layer 94 to cylinder 12. Surface 120 of layer 94 is in contact with the first surface of cylinder 12.

The first surface of cylinder 12 is not visible in the figure. Surface 120 is separated from faceplate 32 by gap 38.

Electrode 44 is affixed to faceplate 12. Alignment layer 52 is affixed to electrode 44. Feedthrough 50 enables electrical contact to electrode 44 external to cell 210. Surface 120 of layer 94 is processed to contain a plurality of alignment grooves 244. Grooves 244 assist in aligning a cholesteric phase liquid crystal material 248 introduced into cell 210. Only a small portion of material 248 is shown in the figure for convenience. Liquid crystal materials are well understood by those knowledgeable in the state of the art, and therefore liquid crystal 248 is not shown in detail.

Liquid crystal materials which are utilizable in my invention include cholesteric liquid crystal materials. Suitable materials are identified in U.S. Pat. No. 3,627,408 to Fergason, Dec. 14, 1971. Liquid crystal materials can be introduced to cell 210 by the use of flow channels 250 recessed in surface 20 of cylinder 12. Channel 250 is given a different designation than the channels utilized in other figures to emphasize the latitude available in my invention in locating a fill channels in cell 210 to assist in filling cell 210 with a liquid crystal material.

Use of MCP 212 in cell 210 provides several advantages in my invention. By positioning layer 94 on surface 236 of electrode 230, electrode 230 provides a mechanical boundary constraint which promotes the first surface of layer 94 to assume a planar form. This facilitates maintaining a consistent gap 38 within cavity 70 of cell 210. This is essential for establishing a high quality cell 210. An electric field can be applied to cell 210 by the use of a high velocity electron beam writing technique. A glass to glass solder ring 252 is utilized to established a vacuum seal between wall 242 of MCP 212 and open end 163 of vacuum tube 130. Tube 130 is shown cutaway for convenience.

An electron gun is located in tube 130 opposite end 163 to generate an electron beam. An acceleration means is provided to establish a potential difference between electrode 228 and the cathode of the electron gun to accelerate the electron beam toward holes 232 in electrode 238. In addition, a deflection means is provided to position the electron beam over each hole 232 in electrode 228. This enables an input electron density to be applied to each pore 220 of MCP 212. The electron beam, acceleration means and deflection means are not shown in the figure for convenience.

Due to the electric field existing in MCP 212, electrons which are directed onto the holes 232 in electrode 228 and enter the pore 220 which overlaps the hole 232 in electrode 228 are accelerated toward the hole 232 in electrode 230 which overlaps the pore 220. Electrons traversing pores 220 encounter collisions with the side walls of the pore 220. These collisions enable an amplification in the number of electrons which exit the pore 220 thru hole 232 in electrode 230 which overlaps the pore 220 compared to the number of electrons which enter the pore 220. Due to the electric field applied to MCP 212, electrons which enter MCP 212 and exit MCP 212 will strike a portion of the first surface of layer 94 which overlaps the hole 232.

An electric field can be applied to cell 210 by operating cell 210 in a high velocity mode of equilibrium writing. Equilibrium writing is accomplished by applying a potential difference between electrode 44 and electrode 236 in synchronism with the position of the electron beam on electrode 228. The potential existing between electrode 228 and electrode 230 is adjusted to enable electrons leaving holes 232 in electrode 230 to posses an energy which lies between the first crossover point and the second crossover point on the curve of the secondary electron emission ratio versus primary energy for the material utilized for layer 94. Such considerations are well understood by those knowledgeable in the state of the art.

Applicant believes that addition benefits of utilizing a MCP with the liquid crystal cell in the manner described includes the capability to increase resolution by avoiding redistribution of electrons which bombard the portion of the first surface of layer 94 which overlaps a hole 232. Applicant believes the volume associated with the hole 232 in electrode 230 will function as an electron collector and confine electrons which bombard the first surface of layer 94 which overlaps the hole to a volume 261 associated with the hole 232 thereby avoiding redistribution of electrons to other areas of the target.

Figure 7:
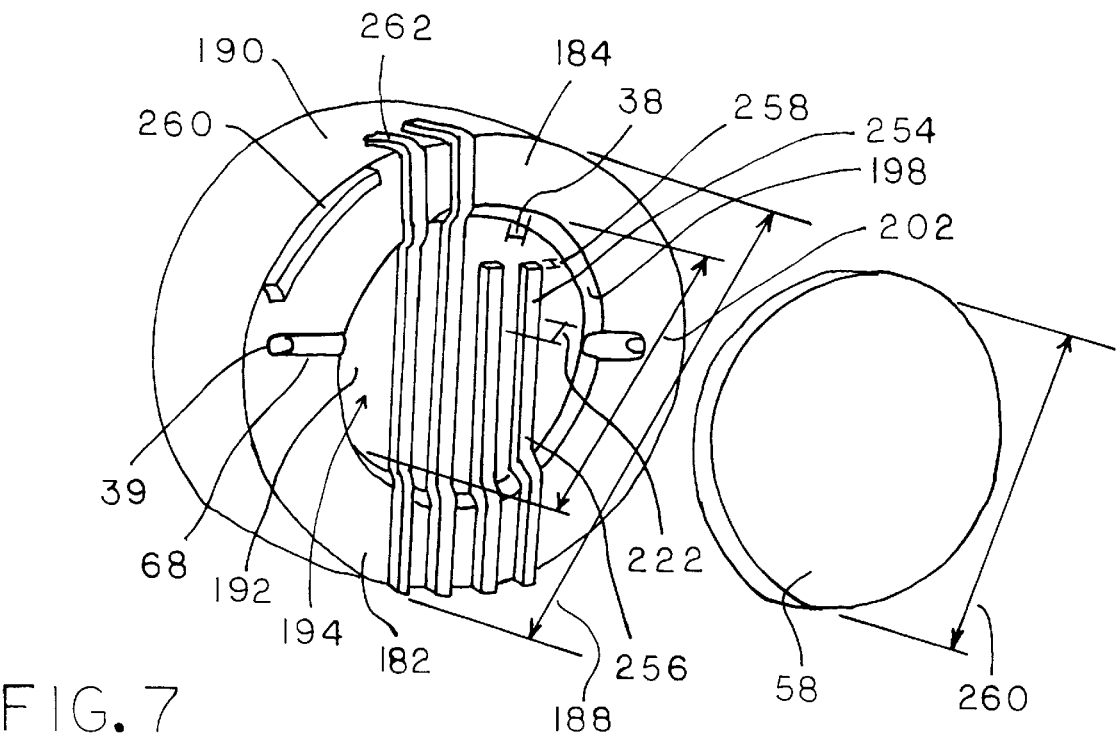
FIG. 7 shows a liquid crystal cell which is utilizes plurality of column electrodes affixed to the recessed surface of a well formed in a cylinder.

FIG. 7 shows substrate 182 with reference surface 192 recessed from surface 184 by gap 38. Substrate 182 of FIG. 7 is similar to substrate 182 of FIG. 5. Affixed to surface 192 is a plurality of transmissive column conductors 254. Adjacent conductors 254 are displaced by period 222. Each conductor 254 further includes a first surface 256 essentially parallel to and separated from a second surface by a conductor thickness 258. The second surface of each conductor 254 is in contact with surface 192. The second surfaces of conductors 254 are not visible in the figure.

Each conductor 254 is routed over substrate 182 so that the second surface of each conductors 254 makes contact with surface 192 and wall 198 of well 194 and surface 184 of substrate 182. Substrate 58 is positioned over well 194. A glass to glass solder ring 260 is utilized to affix substrate 58 to substrate 182. FIG. 7 is shown in an exploded view. A lateral dimension 260 of substrate 58 is chosen to be less than dimension 188 but greater than diameter 202 so ring 260 can affixed substrate 58 to surface 184 of substrate 182.

Each conductor 254 is folded over wall 190 to provide an external electrical connection pad 262 to facilitate electrical connection to conductors 254 in well 194. Utilization of pads 262 is an alternative to constructing a feedthrough in the substrate. Utilizing pads 262 emphasizes the latitude available in my invention. Only a few conductors 254 are shown folded over surface 190 to form pads 262 for convenience. Conductors 254 could be recessed in channels formed in surface 184 to enable surface 256 to be coplanar with surface 184 to facilitate sealing a liquid crystal material in well 194. Utilizing the information provided herein, such modifications will be obvious to those knowledgeable in the state of the art.

Channels 68 are utilized with port holes 39 to assist in filling well 194 with a liquid crystal material. The liquid crystal material is not shown in the figure.

Figure 8:
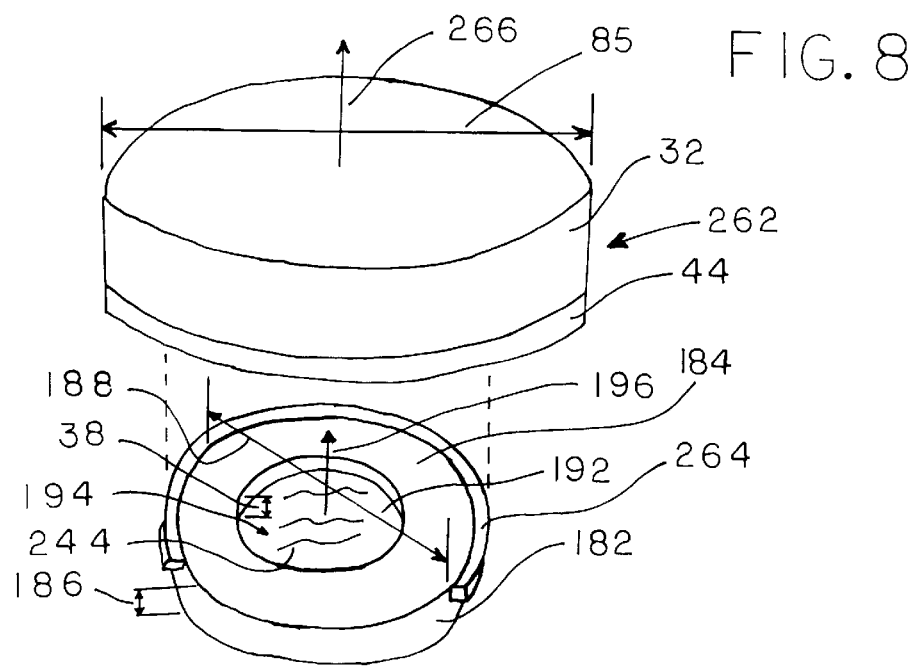
FIG. 8 shows a liquid crystal cell utilizing a well formed in an insulating substrate.

FIG. 8 shows still yet another liquid crystal cell 262. Cell 262 further includes faceplate 32. Cell 262 further includes substrate 182. Substrate 182 contains well 194. Well 194 is formed in substrate 182 by recessing surface 192 from surface 184 by gap 38. The second surface of substrate 182 is separated from surface 184 by thickness 186. The second surface of substrate 182 is not visible in the figure. FIG. 8 is shown in an exploded view. Surface 184 is affixed to faceplate 32 by a solder ring 264. Ring 264 is shown cut away for convenience.

Materials suitable for substrate 182 include glass. Substrate 182 could be a microscope slide or a microscope slide cover glass. Surface 192 is processed to posses a plurality of alignment groves 244 to facilitate aligning a liquid crystal material confined in well 194. The liquid crystal material is not shown in the figure for convenience. Utilizing glass for substrate 182 facilitates implementation of an economical technique for providing an alignment means for aligning liquid crystal materials contained in cell 262.

An electric field is applied to cell 262 by use of an electron beam addressing mechanism which deposits charge on the second surface of substrate 182 in synchronism with the potential applied to electrode 44 affixed to faceplate 32. Surface 184 is in contact with electrode 44. FIG. 8 is shown in exploded manner for convenience. Electrode 44 is processed to possess alignment groves to provide a means for aligning a liquid crystal material contained between the first surface of electrode 44 and surface 192 of well 194. The first surface of electrode 44 is not visible in the figure. Alignment grooves in electrode 44 are not shown in the figure for convenience.

Since charge is deposited on the second surface of substrate 182 by an electron beam addressing mechanism, there is no need for an electrode on surface 192 of substrate 182 in the embodiment shown in FIG. 8. Accordingly, well 194 is shown in the figure without an electrode affixed to surface 192. The electron beam addressing mechanism is not shown in the figure. Suitable electron beam addressing mechanism were shown in other figures.

Liquid crystal material can be painted on surface 192 and/or deposited in well 194 prior to surface 184 being affixed to faceplate 32. This avoids any requirements for the use of fill channels to assist in filling well 194 after affixing substrate 182 to faceplate 32. Dimension 188 of is selected to be less than dimension 85 of faceplate 32. An axis of revolution 266 of faceplate 32 is colinear with axis 196. Selecting dimension 188 to be less than dimension 85 enables electrical contact to be established with the portion of electrode 44 which is not overlapped by substrate 182. Consequently, faceplate 32 is shown without feedthrough 52. Cell 262 may be affixed to an open end of a vacuum tube of an electron beam addressing mechanism by utilizing an indium seal ring with the indium in contact with electrode 44. The indium seal ring is not shown in the figure for convenience. Utilizing the information provided herein, techniques to seal cell 262 to an electron beam addressing mechanism while providing for convenient external electrical connection to electrode 44 will be obvious to those knowledgeable in the state of the art.

CONCLUSION, RAMIFICATIONS, AND SCOPE OF INVENTION

Thus the reader will see that the liquid crystal cell of the invention provides a convenient arrangement which eliminates the utilization of discrete spacer technologies in the cell, simplifying construction, increasing consistency between cell to cell operation and providing a means for enhancing image quality. While my above description contains many specificities, these should not be construed as limitations on the scope of the invention, but rather as an exemplification of one preferred embodiment thereof. Many other variations are possible. For example, the transparent electrode could be replaced by a plurality of column electrodes so the liquid crystal cell is compatible with a row addressed electron beam source array. Such addressing configurations include U.S. Pat. No. 5,036,317 to Buzak, Jul. 30, 1991. Accordingly several electrode means are compatible with the cell of my invention.

In addition, the electrode affixed to the faceplate of my invention could be reflective, and the light to be modulated by the cell incident on the insulating substrate. Utilizing the information identified herein, those knowledgeable in the state of the art will be able to identify electron beam addressing mechanisms which are capable of applying electric fields to such a configuration.

Additional techniques could be utilized to assist in establishing a suitable boundary constraint to influence the insulating substrate to form a planar region overlapped by the faceplate. Such techniques include contouring the first surface of the cylinder component of the liquid crystal cell in a manner which increases tension in the insulating substrate when the insulating substrate is affixed to the cylinder. This approach is distinguished over U.S. Pat. No. 4,784,833, due to the face that the cylinder of my invention possesses a hole in the central portion of the cylinder. Furthermore, my invention eliminate the need for discrete spacer technologies thereby avoiding any image degradation attributed to the presence of spacers in the path of the electromagnetic wavefront propagating the cell.

Additional manufacturing options exist for establishing the separation gap between the reference surface of the cylinder and faceplate of my invention. The work bench utilized to establish the separation gap could be a transmissive substrate. This would enable the orientation of the faceplate to be observed with an interferometer configured to detect angular errors in the orientation of the reference surface of the faceplate. A transparent conductive coating could be applied to the reference surface of the work bench establishing a capacitance probe between the conductive coating and the transparent electrode of the faceplate. Utilizing the proper electronic signal processing with the capacitance probe, positioning commands can be generated to position the faceplate to the proper gap setting. Utilizing the information contained herein, such techniques will become obvious to those knowledgeable in the state of the art.

The preferred embodiment of my invention is the cell identified in FIG. 8 with the cell utilizing a cholesteric phase liquid crystal.

Applicant also believes that by fabricating a well with optical polishing techniques, the opportunity exists that this operation could also facilitate alignment of liquid crystal materials. Accordingly, the scope of the invention should be determined not by the embodiments illustrated, but by the appended claims and their legal equivalents.

I claim:

1. A liquid crystal cell comprising:

a well formed in a first substrate, said well comprises an orifice in said first substrate and a reference surface recessed from said orifice and embedded in said first substrate, a second substrate affixed to said first substrate, said second substrate covers said orifice, alignment means to align a liquid crystal material disposed between said second substrate and said reference surface, an electric field means for applying an electric field to said liquid crystal material, said electric field means comprising an electrode means affixed to said second substrate, seal means to seal said liquid crystal material in said well, said electrode means comprising a monolithic electrode.

2. The device of claim 1 wherein said electric field control means further includes an electron beam generating means.

3. A liquid crystal cell comprising:

a first substrate comprising a hollow region extending between a first opening in an exterior reference surface formed on said first substrate and a second opening in a second surface located on said first substrate, said second surface opposing and separated from said reference surface by a substrate thickness, a second substrate having a third surface thereon recessed in said hollow region, said second substrate is transmissive, said third surface faces and is offset from said first opening by a cell gap, said second substrate is affixed to said first substrate by a first affixing means maintaining a fixed spatial relation between said third surface and said reference surface, at least one inside side surface formed in said first substrate to define a side wall forming an outer boundary of said hollow region, said outer boundary spanning said substrate thickness between said reference surface and said second surface, said side boundary intersects said reference surface forming a perimeter surrounding said first opening limiting an expanse of said first opening, said side boundary surrounds said third surface limiting a second expanse of said third surface thereby enabling said third surface to be recessed in said hollow region and entirely offset from said first opening by said cell gap, a thin insulating substrate comprising a fourth surface, said fourth surface facing said reference surface spreading across said perimeter covering said first opening and said third surface, said insulating substrate is affixed to said first substrate by a second affixing means, said second affixing means comprising said reference surface functioning as a mechanical boundary condition engaging said fourth surface of said insulating substrate enabling said second affixing means to maintain a tension in said insulating substrate promoting said fourth surface to conform to said reference surface establishing a separation distance between said fourth surface and said third surface dependent on said cell gap thereby defining a cavity between said fourth surface and said third surface within said hollow region surrounded by said side boundary whereby said side boundary is precluded from being sandwiched between said fourth surface and said third surface, seal means to enable a liquid crystal material disposed in said cavity to be contained in said cavity, electric field means for applying to said liquid crystal material an electric field comprising:
 a monolithic transmissive conductor affixed to said third surface of said second substrate,
 electron source means for depositing on said insulating substrate an electronic charge dependent on a potential signal applied to said conductor.

4. The device of claim 3 wherein said third surface and said reference surface are essentially planar parallel surfaces.

5. A liquid crystal cell comprising:
a first substrate comprising a hollow region extending between an opening in an exterior reference surface formed on said first substrate and a second surface recessed in said hollow region and entirely offset from said opening by a cell gap,
said reference surface is essentially planar,
said second surface is essentially planar and essentially parallel to said reference surface, said second surface is embedded in said first substrate maintaining fixed spatial relations with said reference surface, at least one inside side surface formed in said first substrate to define a side wall forming an outer boundary of said hollow region spanning said gap between said reference surface and said second surface, said side boundary intersects said reference surface forming a perimeter surrounding said opening limiting an expanse of said opening, said side boundary surrounds said second surface limiting a second expanse of said second surface thereby enabling said second surface to be entirely offset from said opening by said gap, a transmissive substrate comprising a transmissive monolithic conductor affixed thereon, said conductor facing and in engagement with said reference surface spreading across said perimeter covering said opening defining a cavity between said conductor and said second surface within said hollow region surrounded by said side boundary whereby said side boundary is precluded from being sandwiched between said conductor and said second surface, affixing means to affix said transmissive substrate to said first substrate, seal means to enable a liquid crystal material disposed in said cavity to be contained in said cavity, electric field means for applying to said liquid crystal material an electric field comprising:
 electron source means for depositing on said first substrate an electronic charge dependent on a potential signal applied to said conductor.

6. The device of claim 5 wherein said second surface is formed in said first substrate.

7. The device of claim 6 wherein said liquid crystal material comprises a cholesteric phase liquid crystal.

8. A liquid crystal cell comprising:
a first substrate comprising a hollow region extending between a first opening in an exterior reference surface formed on said first substrate and a second opening in a second surface located on said first substrate, said second surface opposing and separated from said reference surface by a substrate thickness, a second substrate having a third surface thereon recessed in said hollow region, said second substrate is transmissive, said third surface facing and offset from said first opening by a cell gap, said second substrate is affixed to said first substrate by a first affixing means enabling said third surface to maintain a fixed spatial relation with said reference surface, at least one inside side surface formed in said first substrate to define a side wall forming an outer boundary of said hollow region spanning said substrate thickness between said reference surface and said second surface, said side boundary intersects said reference surface forming a perimeter surrounding said first opening limiting an expanse of said first opening, said side boundary surrounds said third surface limiting a second expanse of said third surface thereby enabling said third surface to be entirely offset from said first opening by said cell gap, a third substrate having a fourth surface thereon, said fourth surface facing said reference surface spreading across said perimeter overlapping said first opening and said third surface such that said third substrate overlaps said reference surface and covers said first opening, second affixing means for affixing said third substrate to said first substrate comprising said reference surface functioning as a mechanical boundary condition engaging said fourth surface of said third substrate enabling said second affixing means to maintain a tension in said third substrate promoting said fourth surface to conform to said reference surface thereby establishing a separation distance between said fourth surface and said third surface dependent on said cell gap thereby defining a cavity between said fourth surface and said third surface within said hollow region surrounded by said side boundary whereby said side boundary is precluded from being sandwiched between said fourth surface and said third surface, seal means to enable a liquid crystal material disposed in said cavity to be contained in said cavity, electric field means for applying to said liquid crystal material an electric field comprising:
    a transmissive monolithic conductor affixed to said third surface of said second substrate,
    electron source means for depositing on said third substrate an electronic charge dependent on a potential signal applied to said conductor.

9. A liquid crystal cell comprising:

faceplate means comprising:
    a first substrate comprising a hollow region extending between an opening in an exterior reference surface formed on said first substrate and a second surface recessed in said hollow region and entirely offset from said opening by a cell gap,
    said second surface is embedded in said first substrate maintaining a fixed spatial relation with said reference surface,
    at least one inside side surface formed in said first substrate to define a side wall forming an outer boundary of said hollow region, said outer boundary spanning said gap between said reference surface and said second surface,
    said side boundary intersects said reference surface forming a perimeter surrounding said opening limiting an expanse of said opening,
    said side boundary surrounds said second surface limiting a second expanse of said second surface thereby enabling said second surface to be entirely offset from said opening by said gap,
a second substrate having a third surface thereon, said third surface facing said reference surface spreading across said perimeter overlapping said first opening and said second surface such that said second substrate overlaps said reference surface and covers said first opening,
affixing means for affixing said second substrate to said first substrate comprising said reference surface functioning as a mechanical boundary condition engaging said third surface of said second substrate enabling said affixing means to maintain a tension in said second substrate promoting said third surface to conform to said reference surface thereby establishing a separation distance between said third surface and said second surface dependent on said gap thereby defining a cavity between said third surface and said second surface within said hollow region surrounded by said side boundary whereby said side boundary is precluded from being sandwiched between said third surface and said second surface, seal means to enable a liquid crystal material disposed in said cavity to be contained in said cavity, electric field means for applying to said liquid crystal material an electric field comprising:
    a monolithic conductor affixed to said second surface,
    electron source means for depositing on said second substrate an electronic charge dependent on a potential signal applied to said conductor.

10. A liquid crystal cell comprising:

faceplate means comprising:
    a first substrate comprising a hollow region extending between a first opening in an exterior reference surface formed on said first substrate and a second opening in a second surface located on said first substrate, said second surface opposing and separated from said reference surface by a substrate thickness,
    a second substrate having a third surface thereon recessed in said hollow region, said second substrate is transmissive,
    said third surface faces and is offset from said first opening by a cell gap,
    said second substrate is affixed to said first substrate by a first affixing means maintaining a fixed spatial relation between said reference surface and said third surface,
    at least one inside side surface formed in said first substrate to define a side wall forming an outer boundary of said hollow region spanning said substrate thickness between said reference surface and said second surface,
    said side boundary intersects said reference surface forming a perimeter surrounding said first opening limiting an expanse of said first opening,
    said side boundary surrounds said third surface limiting a second expanse of said third surface thereby enabling said third surface to be entirely offset from said first opening by said gap,
third substrate means comprising a third substrate supporting thereon one or more backplane surfaces facing said first substrate, each said backplane surface facing said first substrate overlaps said first opening and said third surface, said third substrate overlaps said reference surface spreading across said perimeter covering said first opening and said third surface,
second affixing means for affixing said third substrate means to said faceplate means comprising said faceplate means functioning as a mechanical boundary condition engaging said third substrate means enabling said third substrate to conform to said reference surface establishing a separation distance between each said backplane surface and said third surface dependent on said cell gap thereby defining a cavity between said third substrate means and said third surface surrounded by said side boundary whereby said side boundary is precluded from being sandwiched between said third substrate means and said third surface, seal means to enable a liquid crystal material disposed in said cavity to be contained in said cavity, electric field means for applying to said liquid crystal material an electric field comprising:
    a transmissive monolithic conductor affixed to said third surface,
    electron source means for depositing on said third substrate means an electronic charge dependent on a potential signal applied to said conductor.

11. A liquid crystal cell comprising:

faceplate means comprising:

a first substrate comprising a hollow region extending between an opening in an exterior reference surface formed on said first substrate and a second surface recessed in said hollow region and entirely offset from said opening by a cell gap, said second surface is embedded in said first substrate maintaining a fixed spatial relation with said reference surface, at least one inside side surface formed in said first substrate to define a side wall forming an outer boundary of said hollow region spanning said gap between said reference surface and said second surface, said side boundary intersects said reference surface forming a perimeter surrounding said opening limiting an expanse of said opening, side boundary surrounds said second surface limiting a second expanse of said second surface thereby enabling said second surface to be entirely offset from said opening by said cell gap, second substrate means comprising a second substrate supporting thereon one or more backplane surfaces facing said first substrate, each said backplane surface facing said first substrate overlaps said opening and said second surface, said second substrate overlaps said reference surface spreading across said perimeter covering said opening and said second surface, an affixing means for affixing said second substrate means to said faceplate means comprising said faceplate means functioning as a mechanical boundary condition engaging said second substrate means enabling said second substrate to conform to said reference surface establishing a separation distance between each said backplane surface and said second surface dependent on said cell gap thereby defining a cavity between said second substrate means and said second surface surrounded by said side boundary whereby said side boundary is precluded from being sandwiched between said second substrate means and said second surface, seal means to enable a liquid crystal material disposed in said cavity to be contained in said cavity, electric field means for applying to said liquid crystal material an electric field.

\* \* \* \* \*